(12) United States Patent
VanBlon et al.

(10) Patent No.: US 11,521,607 B2
(45) Date of Patent: Dec. 6, 2022

(54) LOGIN BASED COMMAND ACTIVATION

(71) Applicant: LENOVO (Singapore) PTE. LTD., New Tech Park (SG)

(72) Inventors: Russell Speight VanBlon, Raleigh, NC (US); Roderick Echols, Chapel Hill, NC (US); Ryan Charles Knudson, Tampa, FL (US); Jonathan Gaither Knox, Morrisville, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 562 days.

(21) Appl. No.: 16/589,571

(22) Filed: Oct. 1, 2019

(65) Prior Publication Data
US 2021/0097986 A1 Apr. 1, 2021

(51) Int. Cl.
*G06F 21/31* (2013.01)
*G10L 15/22* (2006.01)

(52) U.S. Cl.
CPC .............. *G10L 15/22* (2013.01); *G06F 21/31* (2013.01); *G10L 2015/223* (2013.01)

(58) Field of Classification Search
CPC ... G10L 15/22; G10L 2015/223; G06F 21/31; G06F 3/167
See application file for complete search history.

(56) References Cited

U.S. PATENT DOCUMENTS

| | | | |
|---|---|---|---|
| 10,991,373 B1* | 4/2021 | Wang | G06F 21/52 |
| 2019/0073459 A1* | 3/2019 | Chen | G06V 40/70 |
| 2019/0371323 A1* | 12/2019 | Kao | G06V 40/168 |

* cited by examiner

*Primary Examiner* — Phuong H Nguyen
(74) *Attorney, Agent, or Firm* — Kunzler Bean & Adamson (57) ABSTRACT

For login based command activation is disclosed, a processor detects a login interaction that includes a login time interval. The processor further detects a voice command concurrent with the login time interval. The processor activates the voice command based on the voice command being concurrent with the login time interval.

20 Claims, 6 Drawing Sheets

LOGIN BASED COMMAND ACTIVATION

FIELD

The subject matter disclosed herein relates to command activation and more particularly relates to login based command activation.

BACKGROUND

Users may login to a device in order to activate a command.

BRIEF SUMMARY

An apparatus for login based command activation is disclosed. The apparatus includes a processor and a memory that stores code executable by the processor. The processor detects a login interaction that includes a login time interval. The processor further detects a voice command concurrent with the login time interval. The processor activates the voice command based on the voice command being concurrent with the login time interval. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
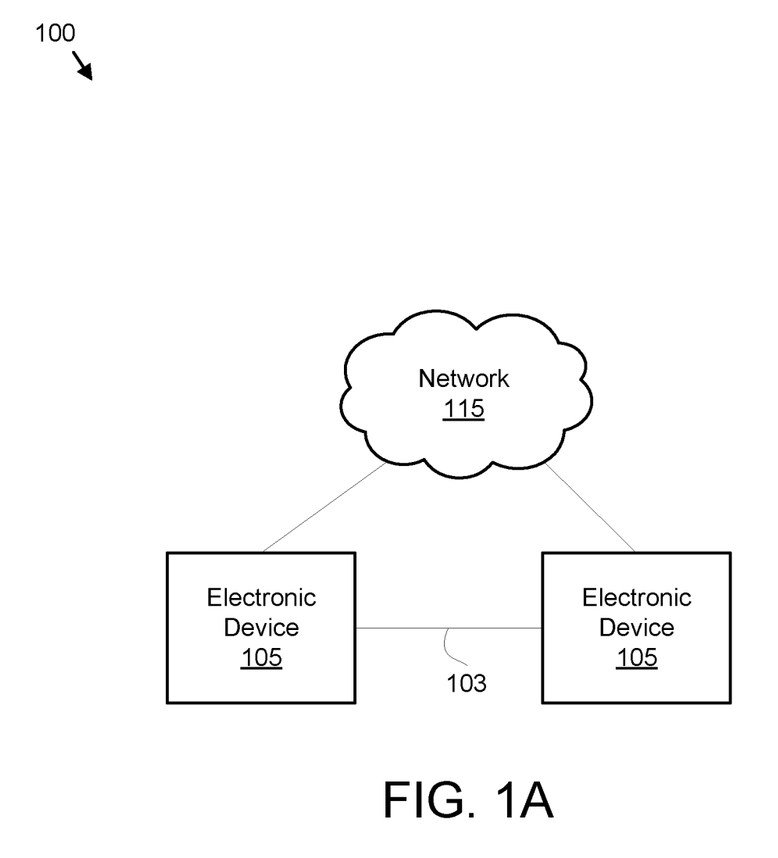
FIG. 1A is a schematic block diagram illustrating one embodiment of a command activation system.

FIG. 1A is a schematic block diagram illustrating one embodiment of a command activation system 100. The command activation system 100 may receive and activate commands from a user. In the depicted embodiment, the command activation system 100 includes one or more electronic devices 105 and a network 115. The electronic devices 105 may communicate through the network 115. The network 115 may be the Internet, a mobile telephone network, a Wi-Fi network, a local area network, a wide-area network, or combinations thereof. In addition, one electronic device 105 may communicate directly with another electronic device 105 through a wireless connection 103.

The user may issue commands to an electronic device 105. The electronic device 105 may receive and activate the commands. In one embodiment, a first electronic device 105 may receive a command and communicate the command to a second electronic device 105 that activates the command. For example, the first electronic device 105 may be a mobile telephone and may receive a command to turn on the second electronic device 105, a television.

In the past, the user first logged into the electronic device 105 and then upon completion of the login interaction was able to issue a command. This process delays the activation of the command. The embodiments detect the login interaction and detect a voice command concurrent with the login interaction. The embodiments further activate the voice command being concurrent with the login interaction. As a result, the user need not wait for the completion of the login interaction in order to issue a command, increasing the efficiency and the utility of the electronic device 105 in receiving and activating commands.

Figure 1B:
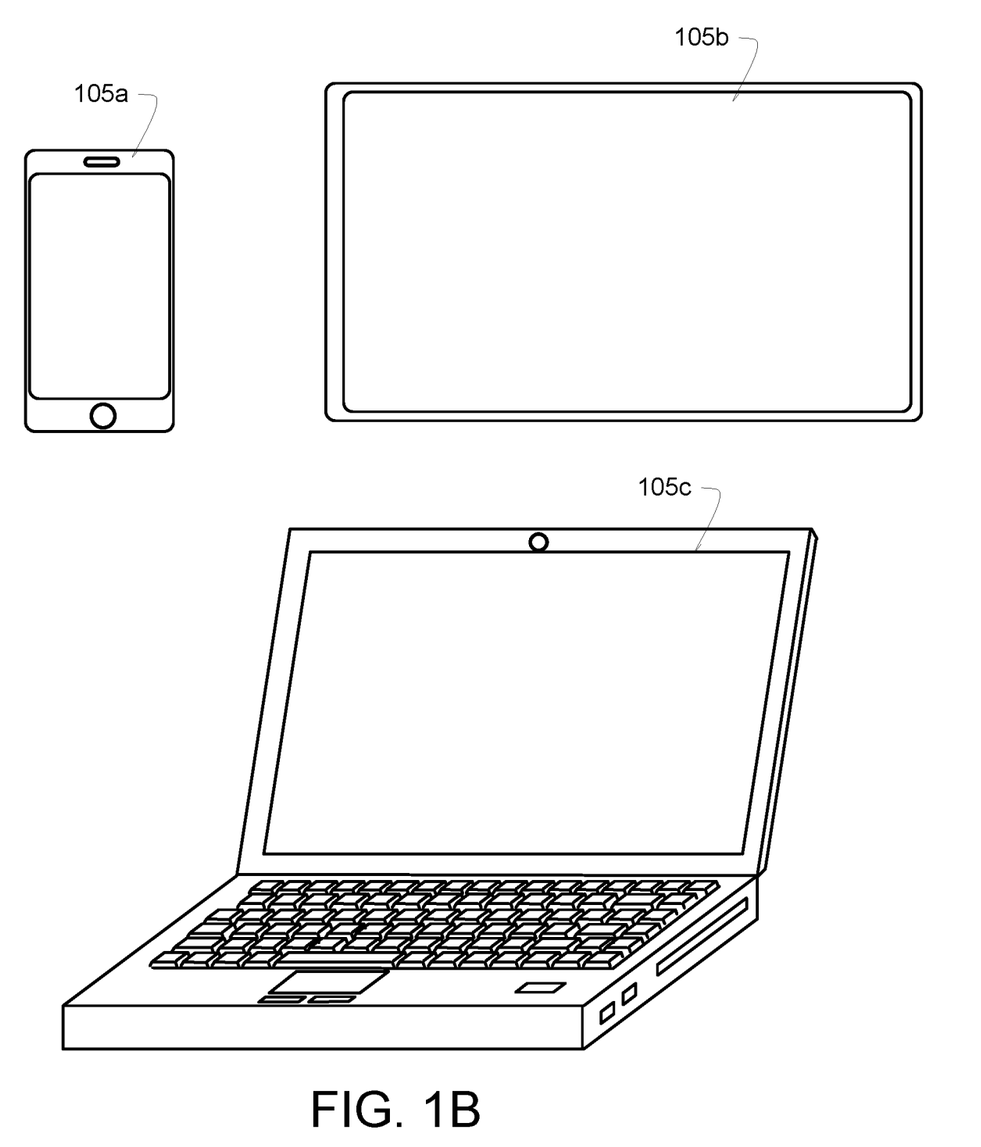
FIG. 1B are drawings illustrating embodiments of electronic devices.

FIG. 1B are drawings illustrating embodiments of electronic devices 105. The depicted embodiment includes a mobile telephone electronic device 105a, a television electronic device 105b, and a laptop computer electronic device 105c. Each electronic device 105 may receive a voice command through a microphone. In addition, each electronic device 105 may activate the voice command. In one embodiment, a second electronic device 105 may receive a command from a first electronic device 105 through a wired connection, the wireless connection 103, and/or through the network 115.

Figure 2A:
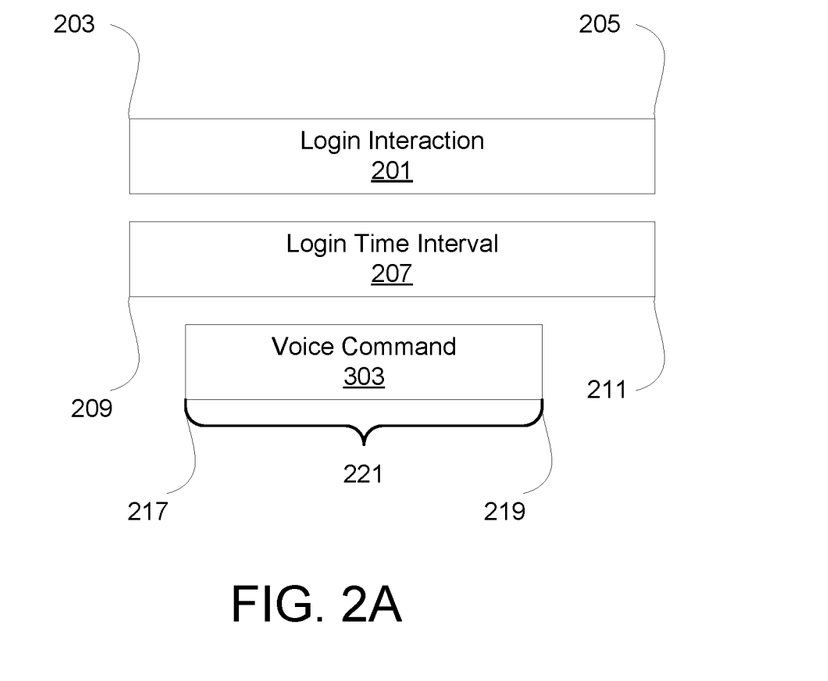
FIG. 2A is a schematic block diagram illustrating one embodiment of a login time interval.

FIG. 2A is a schematic block diagram illustrating one embodiment of a login time interval 207. In the depicted embodiment, a login interaction 201, the login time interval 207, and a voice command 303 are shown as time intervals with time progressing from left to right.

The login interaction 201 may be the presentation of a fingerprint for a fingerprint identification, the entry of a swipe password, the entry of a numeric password, the presentation of a face for a facial recognition, the entry of a picture password, a voice identification, and the like. In one embodiment, the login interaction 201 is a proximity login wherein the user is detecting within a proximity range of 0 to 5 meters.

The login interaction 201 has a login interaction start 203 and the login interaction end 205. The login interaction start 203 may be when the electronic device 105 detects presentation of a biometric such as a fingerprint identification and/or facial identification. For example, the login interaction start 203 may begin with detecting a finger on a fingerprint sensor. In addition, the login interaction start 203 may begin when a face is detected by the camera while the user is not logged in to the electronic device.

In addition, the login interaction start 203 may be when a user activates the electronic device 105, resulting in the display of a login screen. For example, the user may activate a mobile telephone electronic device 105a by pressing a button that results in the display of a swipe login screen. The login interaction start 203 may coincide with the user pressing the button. Alternatively, the login interaction start 203 may coincide with the display of the login screen.

In one embodiment, the login interaction end 205 occurs when the user has successfully logged into the electronic device 105. In an alternate embodiment, the login interaction end 205 occurs when the user successfully completes entry of a password or the like. In a certain embodiment, the login interaction end 205 occurs when the user completes presentation of a biometric.

The login time interval 207 has a login time interval start 209 and the login time interval end 211. In the depicted embodiment, the login time interval start 209 coincides with the login interaction start 203. In addition, the login time interval end 211 may coincide with the login interaction and 205.

The voice command 303 has a voice command start 217 and a voice command end 219. In addition, the voice command 303 has a voice command length 221. The voice command 303 may be concurrent with the login time interval 207 if the voice command start 217 coincides with or follows the login time interval start 209 and the voice command end 219 precedes or coincides with the login time interval end 211.

Figure 2B:
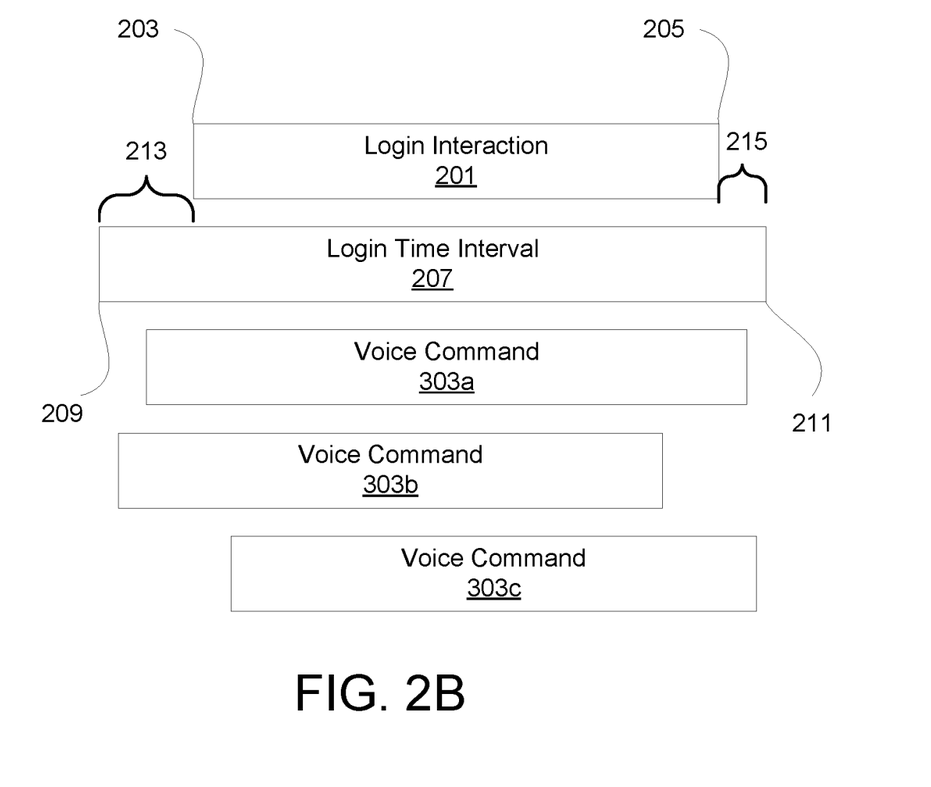
FIG. 2B is a schematic block diagram illustrating alternate embodiments of a login time interval.

FIG. 2B is a schematic block diagram illustrating alternate embodiments of the login time interval 207. In the depicted embodiment, the login time interval start 209 precedes the login interaction start 203 by a start buffer time interval 213. In addition, the login time interval end 211 lags the login interaction end 205 by an end buffer time interval 215.

Three voice commands 303a-c are also shown. Each voice command 303a-c may be concurrent with the login time interval 207 as the voice command start 217 coincides with or follows the login time interval start 209 and the voice command end 219 precedes or coincides with the login time interval end 211.

The start buffer time interval 213 may be in the range of zero to a start maximum measured in seconds. The end buffer time interval 215 may be in the range of zero to an end maximum measured in seconds (s). Table 1 illustrates one embodiment of start maximums and end maximums for login types.

TABLE 1

| Login type | Start maximum (s) | End maximum (s) |
| --- | --- | --- |
| Alphanumeric Password | 2 | 1 |
| PIN | 2 | 2 |
| Swipe Password | 2 | 3 |
| Fingerprint Identification | 3 | 0.5 |
| Facial Identification | 4 | 0.5 |

Figure 3:
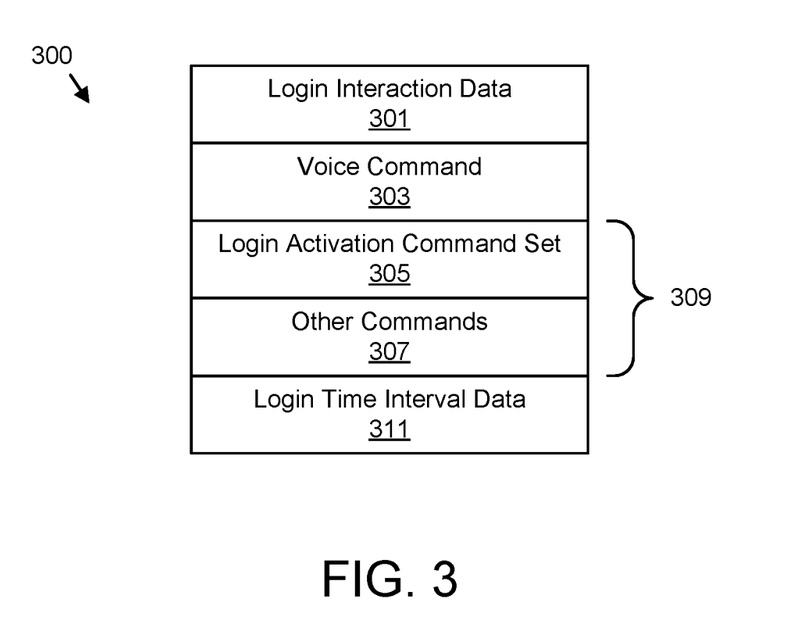
FIG. 3 is a schematic block diagram illustrating one embodiment of command data.

FIG. 3 is a schematic block diagram illustrating one embodiment of command data 300. The command data 300 maybe organized as a data structure in a memory. In the depicted embodiment, the command data 300 includes the login interaction data 201, the voice command 303, a login activation command set 305, other commands 307, and login time interval data 311.

The login activation command set 305 and other commands 307 may form a command set 309. The login activation command set 305 may be a subset of the command set 309. In one embodiment, the login activation command set 305 comprises a navigation command, a communication command, and/or a display command. The voice command 303 may be detected from the login activation command set 305.

The login interaction data 301 may record the login type. In addition, the login interaction data 301 may record the login interaction start 203 and the login interaction end 205.

The login time interval data 311 may record the start buffer time interval 213 and the end buffer time interval 215. The login time interval start 209 may be calculated as the login interaction start 203 minus the start buffer time interval 213. In addition, the login time interval end 211 may be calculated as the login interaction end 205 plus the end buffer time interval 215.

The voice command 303 may record audio from a microphone. The audio may be recorded in a memory and/or an audio buffer. In one embodiment, audio is continuously recorded as the voice command 303. A buffer time interval of audio may be preserved in the voice command 303. The buffer time interval may be in the range of 2 to 20 s. In addition, the voice command 303 may record the voice command start 217, the voice command end 219, and the voice command length 221.

Figure 4:
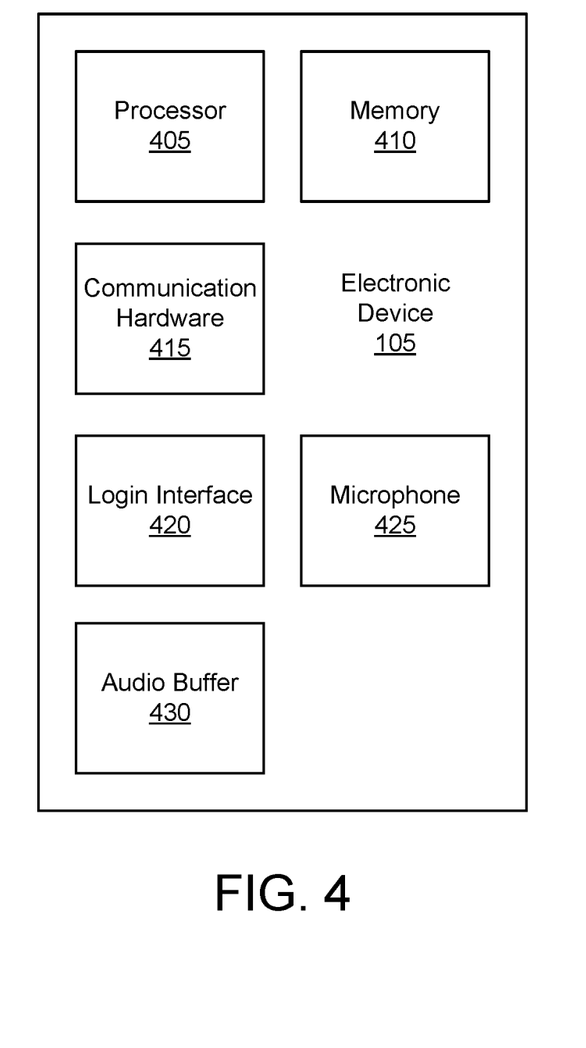
FIG. 4 is a schematic block diagram illustrating one embodiment of an electronic device.

FIG. 4 is a schematic block diagram illustrating one embodiment of an electronic device 105. In the depicted embodiment, the electronic device 105 includes a processor 405, the memory 410, communication hardware 415, a login interface 420, a microphone 425, and the audio buffer 430. The memory 410 may include a semiconductor storage device, a hard disk drive, or combinations thereof. The memory 410 may store code. The processor 405 may execute the code. The communication hardware 415 may communicate with the network 115 and/or another electronic device 105.

The login interface 420 may receive the login interaction 201. The login interaction 201 may be selected from the group consisting of fingerprint identification, a swipe password, a facial identification, a numeric password, a picture password, and a voice identification. The login interface 420 may be a display, a touchscreen display, a keyboard, a camera, a fingerprint pad, or combinations thereof.

The microphone 425 may capture audio in the vicinity of the electronic device 105. The audio may be stored to the audio buffer 430 and/or the memory 410. In one embodiment, the audio buffer 430 is a subset of the memory 410.

Figure 5:
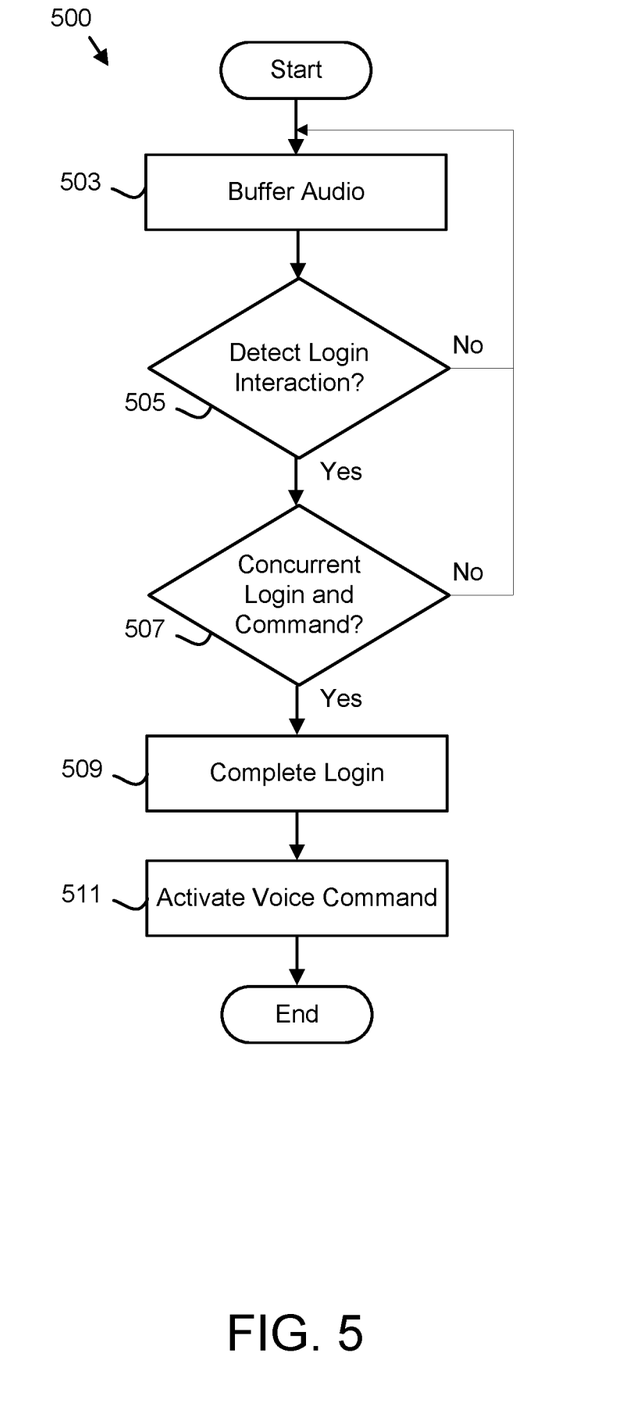
FIG. 5 is a schematic flow chart diagram illustrating one embodiment of a command activation method.

FIG. 5 is a schematic flow chart diagram illustrating one embodiment of a command activation method 500. The method 500 may activate the voice command 303 based on the voice command 303 being concurrent with the login time interval 307. The method 500 may be performed by the processor 405.

The method 500 starts, and in one embodiment, the processor 405 buffers 503 audio received from the microphone 425 to the audio buffer 430 and/or the memory 410. In one embodiment, a buffer time interval of the most recent audio is continuously buffered 503.

The processor 405 may further detect 505 the login interaction 201. The login interaction 201 comprises the login time interval 207. In one embodiment, the processor 405 monitors the login interface 420 for the login interaction start 203. The login interaction 201 may be detected 505 if the user takes an action directed to the login interface 420. For example, the user may touch fingerprint pad login interface 420. In addition, the user may activate a button on the electronic device 105 that results in the presentation of the login interface 420.

If the login interaction 201 is not detected 505, the processor 405 continues to buffer 503 the audio. If the login interaction 201 is detected 505, the processor 405 detects 507 the voice command 303 concurrent with the login time interval 207. In one embodiment, the voice command 303 is only detected from the login activation command set 305. The processor 405 may recognize the voice command 303. In addition, the processor 405 may identify the voice command start 217 and the voice command end 219. The processor 405 may determine if the voice command 303 is concurrent with the login time interval 207.

The voice command 303 may be concurrent with the login time interval 207 if the voice command start 217 coincides with or follows the login time interval start 209 and the voice command end 219 precedes or coincides with the login time interval end 211. In a certain embodiment, the voice command 303 is concurrent with the login time interval 207 if a modified voice command start coincides with or follows the login time interval start 209 and a modified voice command end precedes or coincides with the login time interval end 211. The modified voice command start MS may be calculated as shown in Equation 1, where CS is the voice command start 217, CL is the voice command length 221, and k is a nonzero constant.

$$MS = CS - CL/k \quad \text{Equation 1}$$

The modified voice command end ME may be calculated as shown in Equation 2, where CE is the voice command end 219, CL is the voice command length 221, and 1 is a nonzero constant.

$$ME = CE + CL/1 \quad \text{Equation 2}$$

The use of the modified voice command start and/or modified voice command end to determine if the voice command 303 is concurrent with the login time interval 207 allows long voice commands 303 to be detected 507 as concurrent within the login time interval 207.

If the voice command 303 is not concurrent with the login time interval 207, the processor continues to buffer 503 the audio. If the voice command 303 is concurrent with the login time interval 207, the processor 405 may complete 509 the login to the electronic device 105. In addition, the processor 405 may activate 511 the voice command 303 based on the voice command 303 being concurrent with the login time interval 207 and the method 500 ends. In one embodiment, the processor 405 activates 511 the voice command 303 by recognizing the voice command 303 from the login activation command set 305 and/or the command set 309. In addition, the processor 405 may execute the recognized voice command 303.

The embodiments activate the voice command 303 if the voice command 303 is concurrent with the login time interval 207. As a result, a user may speak the voice command 303 while performing the login interaction 201 and speed the activation of the voice command 303. Thus, the electronic device 105 is more efficient in the execution of the voice command 303, improving the utility of the electronic device 105 for the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
detect a login interaction of a fingerprint identification of a finger on a fingerprint sensor, the login interaction comprising a login time interval that begins with the login interaction and ends with completion of the login interaction;
detect a voice command concurrent with the login time interval; and
activate the voice command based on the voice command being concurrent with login time interval.

2. The apparatus of claim 1, wherein the voice command is detected from a login activation command set that is a subset of a command set.

3. The apparatus of claim 2, wherein the login activation command set comprises a navigation command, a communication command, and/or a display command.

4. The apparatus of claim 1, wherein the login interaction is further selected from the group consisting of a swipe password, a numeric password, a picture password, and a voice identification.

5. The apparatus of claim 1, wherein the login interaction further comprises a proximity login.

6. The apparatus of claim 1, wherein an audio buffer continuously buffers audio inputs from a microphone and a login time interval start precedes a login interaction start by a start buffer time interval.

7. The apparatus of claim 6, wherein a login time interval end lags a login interaction end by an end buffet time interval.

8. A method comprising:
   detecting, by use of a processor, a login interaction of a fingerprint of a finger on a fingerprint sensor, the login interaction comprising a login time interval that begins with the login interaction and ends with completion of the login interaction;
   detecting a voice command concurrent with the login time interval; and
   activating the voice command based on the voice command being concurrent with login time interval.

9. The method of claim 8, wherein the voice command is detected from a login activation command set that is a subset of a command set.

10. The method of claim 9, wherein the login activation command set comprises a navigation command, a communication command, and/or a display command.

11. The method of claim 8, wherein the login interaction is selected from the group consisting of a swipe password, a numeric password, a picture password, and a voice identification.

12. The method of claim 8, wherein the login interaction further comprises a proximity login.

13. The method of claim 8, wherein an audio buffer continuously buffers audio inputs from a microphone and a login time interval start precedes a login interaction start by a start buffer time interval.

14. The method of claim 13, wherein a login time interval end lags a login interaction end by an end buffet time interval.

15. A program product comprising a computer readable storage medium that stores code executable by a processor, the executable code comprising code to:
   detect a login interaction of a fingerprint identification of a finger on a fingerprint sensor, the login interaction comprising a login time interval that begins with the login interaction and ends with completion of the login interaction;
   detect a voice command concurrent with the login time interval; and
   activate the voice command based on the voice command being concurrent with login time interval.

16. The program product of claim 15, wherein the voice command is detected from a login activation command set that is a subset of a command set.

17. The program product of claim 16, wherein the login activation command set comprises a navigation command, a communication command, and/or a display command.

18. The program product of claim 15, wherein the login interaction is selected from the group consisting of swipe password, a numeric password, a picture password, and a voice identification.

19. The program product of claim 15, wherein the login interaction further comprises a proximity login.

20. The program product of claim 15, wherein an audio buffer continuously buffers audio inputs from a microphone and a login time interval start precedes a login interaction start by a start buffer time interval and a login time interval end lags a login interaction end by an end buffet time interval.

\* \* \* \* \*